United States Patent

Moyroud

[15] 3,641,887

[45] Feb. 15, 1972

[54] PHOTOTYPESETTING MACHINES

[72] Inventor: Louis M. Moyroud, 202 Grove Way, Delray Beach, Fla. 33444

[22] Filed: Mar. 11, 1969

[21] Appl. No.: 896,126

[30] Foreign Application Priority Data

Mar. 14, 1968 Great Britain ....................12,327/68

[52] U.S. Cl. ....................95/4.5

[51] Int. Cl. ....................B41b 17/14

[58] Field of Search ....................95/4.5

[56] References Cited

UNITED STATES PATENTS

| | | | |
|---|---|---|---|
| 2,736,770 | 2/1956 | McNaney | 178/15 |
| 3,116,963 | 1/1964 | Kiyasu | 346/107 |
| 3,252,392 | 5/1966 | Ward | 95/4.5 |
| 3,349,677 | 10/1967 | Young | 95/4.5 |

*Primary Examiner*—John M. Horan
*Attorney*—William D. O'Reilly

[57] ABSTRACT

A simple high-speed photocomposing machine is disclosed. Character images are projected from a stationary glass matrix plate through a fixed lens to a continuously moving film. Every matrix character may at all times be projected to any position on the film (see FIG. 1). The film is driven by a drive band. A timing control synchronized with the motion of the film ensures that proper character information is withdrawn from storage at the precise moment to trigger the projection of a character image to the correct location on the continuously moving film. In this manner a complete page of characters is composed virtually simultaneously.

1 Claims, 12 Drawing Figures

INVENTOR
LOUIS M. MOYROUD

W. D. O'Reilly
AGENT

| | RANK |
|---|---|
| A | 8 |
| B | 16 |
| C | 24 |
| D | 32 |
| E | 40 |
| F | 48 |
| G | 56 |
| H | 64 |
| I | 72 |
| J | 80 |
| K | 88 |
| L | 96 |
| M | 104 |
| N | 112 |
| O | 120 |
| P | 128 |
| Q | 136 |
| R | 144 |
| S | 152 |
| T | 160 |
| U | 168 |
| V | 176 |
| W | 184 |
| X | 192 |
| Y | 200 |
| Z | 208 |

| PULSE | ROW | COL. |
|---|---|---|
| 52 | D | 5 |
| 54 | C | 6 |
| 56 | G | 3 |
| 60 | E | 3 |
| 60 | E | 4 |
| 64 | H | 2 |
| 64 | H | 4 |
| 70 | E | 12 |
| 74 | H | 1 |
| 82 | I | 2 |
| 94 | H | 2 |
| 112 | N | 6 |
| 120 | O | 3 |
| 120 | O | 5 |
| 128 | P | 1 |
| 134 | M | 8 |
| 148 | P | 2 |
| 150 | O | 3 |
| 150 | O | 5 |
| 150 | O | 7 |
| 150 | O | 10 |
| 158 | P | 1 |
| 158 | P | 9 |
| 160 | T | 4 |
| 172 | S | 1 |
| 174 | P | 13 |
| 182 | S | 11 |
| 190 | T | 4 |

| COL = | 1 | 2 | 3 | 4 | 5 | 6 | 7 | 8 | 9 | 10 | 11 | 12 | 13 --- |
|---|---|---|---|---|---|---|---|---|---|---|---|---|---|
| LINE 1 | 128 P-1 | 64 H-2 | 120 O-3 | 160 T-4 | 120 O-5 | 112 N-6 | | | | | | | |
| LINE 2 | 74 H-1 | 82 I-2 | 56 G-3 | 64 H-4 | | | | | | | | | |
| LINE 3 | 172 S-1 | 148 P-2 | 60 E-3 | 60 E-4 | 52 D-5 | | | | | | | | |
| LINE 4 | 158 P-1 | 94 H-2 | 150 O-3 | 190 T-4 | 150 O-5 | 54 C-6 | 150 O-7 | 134 M-8 | 158 P-9 | 150 O-10 | 182 S-11 | 70 E-12 | 174 R-13 |

INVENTOR
LOUIS M. MOYROUD

AGENT

INVENTOR
LOUIS M. MOYROUD

W D O'Reilly
AGENT

INVENTOR
LOUIS M. MOYROUD

AGENT

PHOTOTYPESETTING MACHINES

BACKGROUND AND BRIEF DESCRIPTION OF THE INVENTION

This invention pertains to a high-speed nonimpact photocomposing machine; more specifically, it is concerned with the employment of a machine of this nature as a printout for computers.

High speed is the primary prerequisite of a computer printout device. Existing impact printers must by nature make a direct impression on the paper—hence their speed is limited by the motion of a mechanical printing hammer or the like, and impact printers are thus unable to attain ultrahigh speeds.

U.S. Pat. No 3,188,929 discloses a high-speed nonimpact printing system. Speeds of several hundred characters per second are attained by sweeping a moving lens along a plane parallel to a fixed matrix grid and a fixed image receiving surface, such as a film. This system is capable of projecting a complete line for each lens sweep, because during the sweep the image of any of the master characters on the matrix grid is capable of being projected to any character-image position in the line. The reciprocating lens, however, limits machine speed somewhat—because of the inertia associated with back and forth motion, it must start, slow down, stop, reverse direction, and start up again during a sweep. Furthermore, the nature of the system limits the machine to a line per sweep.

The present invention is a simple optical printer capable of producing during a single "sweep" complete pages of characters of typographical quality at speeds on the order of 30,000 characters per second. Characters are projected from a stationary matrix through a fixed lens to an image-receiving surface (such as a film) which is continuously moving in the plane of the fixed lens. A timing control means in synchronism with the film motion generates signals which trigger light bursts from a source of illumination—through the matrix—at intervals of sufficient frequency to enable an entire page of characters to be composed virtually simultaneously. There is no back and forth motion to limit speed—the film is adapted to move continuously at speeds of up to 3 feet per second.

The ultrahigh speed of the present innovation is possible because every character on the matrix may be projected to any position on the image-receiving surface (limited only by the magnification ratio of the lens) at all times. This—together with the rapid, continuous film motion—results in the attainment of the aforementioned speeds.

The matrix or character presentation means may comprise a glass plate having a plurality of rows and columns of letters of the alphabet. For example, the matrix can have 16 columns of the capital alphabet (A through Z). Each of the characters may be positioned within a respective "character area," each of which occupies equal physical dimensions on the matrix—hence nonproportional character spacing would result. Or, if desired, the individual characters could be etched on the plate taking into account their relative widths (based upon a known system such as 18 units of an "EM")—in which case proportional character spacing would result. When proportional character spacing is desired, the film is turned 90° so that the lines of text are formed parallel to the edges of the film.

The source of illumination may be a plurality of flash lamps, a cathode-ray-tube (CRT), or a laser. Point-size changing capability is available, if desired, by the employment of a conventional lens turret.

The present invention will be more fully described in the detailed description which follows, in which.

DETAILED DESCRIPTION OF THE INVENTION

Figure 1:
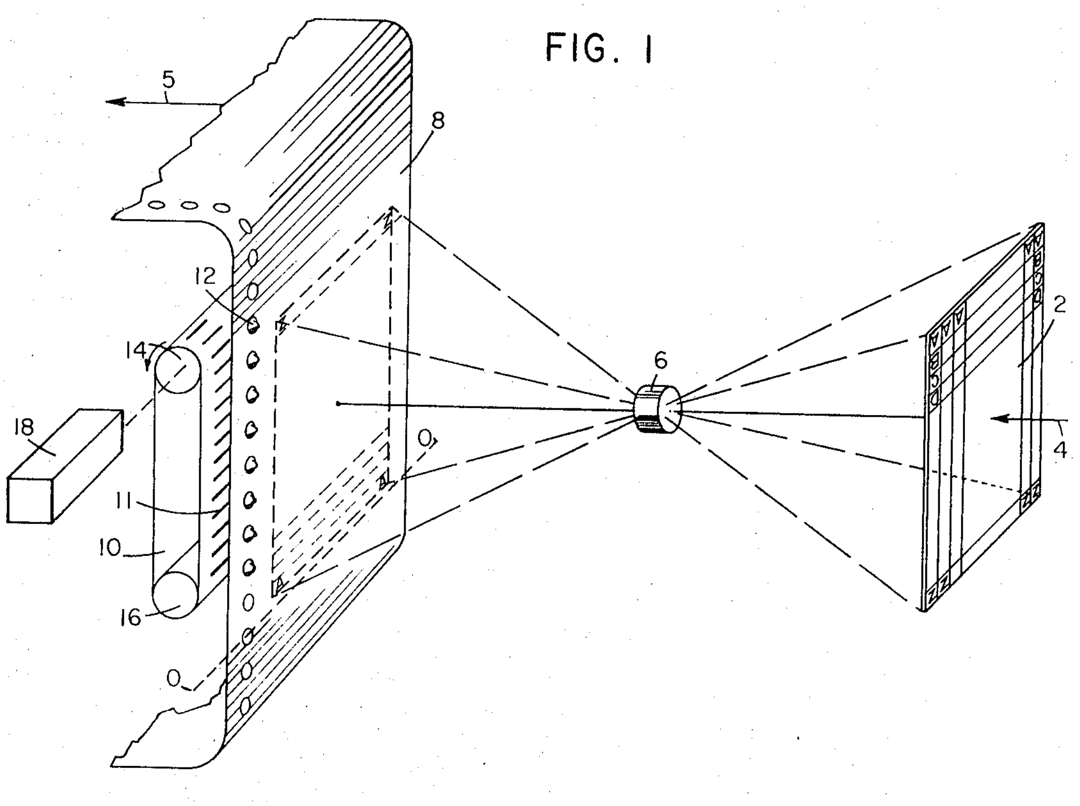
FIG. 1 represents schematically the optical system of the machine.
Figures 2, 3, 4, 5:
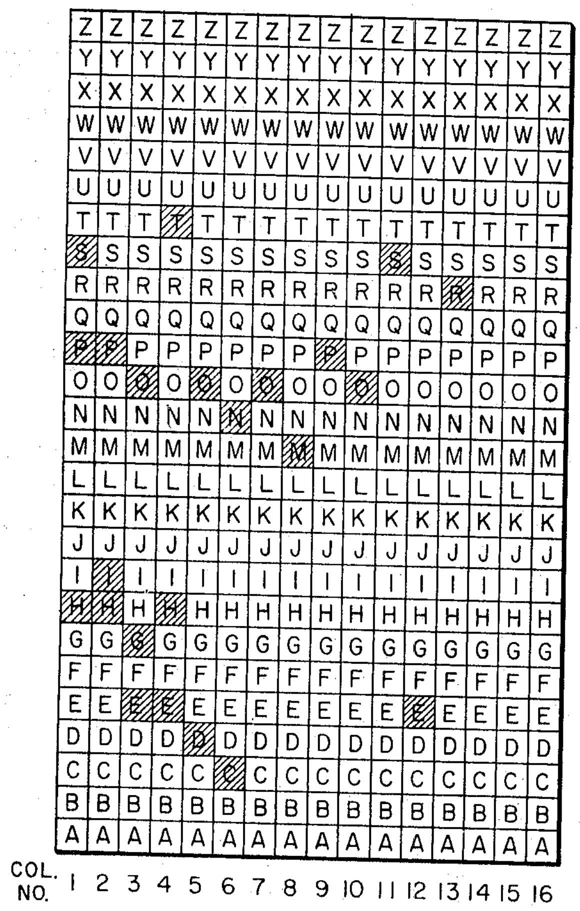
FIG. 2 represents character matrix of one embodiment of the invention.
FIGS. 3, 4 and 5 are tables used in conjunction with the description of the operation of the machine.

In one embodiment of the machine the matrix is a glass plate with transparent characters on opaque background. In FIG. 1, the matrix is shown at 2. This matrix is also shown in FIG. 2, in the upside down position. It is made up of character arranged in rows and columns, as shown. In the description of an embodiment of the machine a column will mean a vertical strip of different characters, as identified by column numbers 1 to 16 in FIG. 2, and a row will mean a horizontal strip of like characters, identified by A to Z in the example shown. The matrix is at a fixed position in the machine—it does not move. Predetermined areas of the matrix can be selectively illuminated by an appropriate source from the direction of arrow 4 to project characters to a photosensitive surface 8 (referred to as "film" in this description) through a fixed projection lens 6. The appropriate source of illumination may, for example, be a conventional cathode-ray-tube (CRT), a laser having a plurality of deflection crystals and a multiplicity of fiber optics bundles (light channels) positioned between the laser and the matrix- or character-presentation means, or the source may be a plurality of flash tubes.

During the operation of the machine the film 8 is continuously driven in the direction of arrow 5 by a conventional drive band 10 provided with sprockets 12 engaging corresponding holes in the films and supported by rollers 14 and 16. Roller 14 is also provided with teeth (not shown) engaging band 10, and is driven by a driving mechanism represented by box 18. The drive band 10 is provided with apertures such as slits or masks 11 associated with a photoelectric device to generate a continuous train of pulses in synchronism with the motion of film 8. If desired, drive band slits 11 could be replaced by a wheel or disc with timing slits at precisely spaced intervals around the periphery thereof, in order to ensure extremely accurate timing control. The timing wheel would, of course, by physically associated with the film and photoelectric device so as to generate a continuous chain of pulses in synchronism with the motion of film 8. Moreover, spaced optical or magnetic marks (such as dots) could be made on the film itself in order to achieve accurate timing control in yet another manner.

Figure 11:
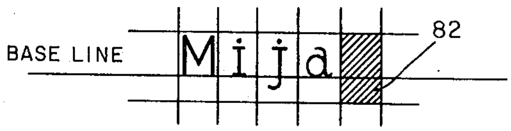
FIG. 11 is a graphic representation of a "character area" showing nonproportional spacing of characters.

The potential image of matrix 2 is represented on the film by rectangle ZZAA. This image appears on the film as shown in FIG. 2 and is, of course, stationary while the film is moving so that any "character area" of the film will, at a time, receive the potential image of any of the characters of matrix 2. In a text comprised of columns and rows of characters of the same width a "character area" can be defined as an area of a width sufficiently large to accommodate such characters as M and W and of a height slightly larger than the height of upper case characters, plus descenders of lower case characters. Such a "character area" for nonproportional spacing characters is shown at 82 in FIG. 11. In a text composed with nonproportionally spaced characters, all character areas will align vertically as well as horizontally so that the horizontal location of a character in a line can be represented by the column number of the projected image of the matrix.

As explained above, as the film 8 (FIG. 1) moves up, its surface is swept by the potential image of all of the matrix characters so that, at a given time, a selected character may be projected to a predetermined character location on the page to be composed. The illuminating means associated with the matrix 2 are controlled by the circuit in such a way that intense and short light patches are produced on the matrix in the locations of the characters to be projected at an exact predetermined instant. In a preferred embodiment of the invention the light patches are produced by a cathode ray tube (herein referred to as CRT) as explained in U.S. Pat. Nos. 3,188,929 and 3,416,420. The CRT is shown at 24 in FIG. 6 with its face adjacent to matrix 2. The photoelectric pickup is represented in this figure by a lamp 28, an optical system 26 and a photodiode 30—this pickup functions in conjunction with the slits 11 of FIG. 1.

Considering now a single column of a page to be composed, the instant at which a character must be projected depends on two factors—its vertical location on the matrix, and the line in the page where it is located. The vertical location of a character can be represented by a "rank value". The rank value of all upper case letters are shown in FIG. 3. In the example that will be subsequently described it is assumed that the magnification ratio of the matrix to the image is unity, and that the character rows of the matrix are vertically spaced by eight typographical points. It should be understood that the magnification ratio may be varied, if desired, by the use of a conventional point-size changing mechanism, as set forth more fully below. Assuming now that, at the beginning of a new machine cycle the base line of the first row of character areas (as previously defined) of the text to appear on the film is adjacent to line 0—0, of FIG. 1 the film will move up a distance of 8 points to bring said area into optical alignment with the projected row of "A" images, it will move 16 points to bring the same area in register with the projections of "B" images and 208 points to bring the same area in position to receive "Z' s." If, for example, the first line of a page of text was the upper case alphabet, the A would be projected after the film has moved up by 8 units, the B will be projected at 16 units, the C at 24 units etc.

The projection timing of characters of the second line of the page will depend not only on their rank values, but also the line spacing selected between the first and second line. Thus, the "accumulated line spacing" measured, for example, in points from a line selected as reference line (for example—first line of a page) to any other line must be added to the rank value of the characters of said other line in order to determine the "flash time" of any character of said other line. Therefore, "flash time" equals "rank value" plus "accumulated line spacing."

The operation of the machine will now be explained relative to the composition of the following text:

first line: PHOTON
second line: HIGH
third line: SPEED
fourth line: PHOTOCOMPOSER Throughout the example the interline spacing will be 10 points.

Figure 6:
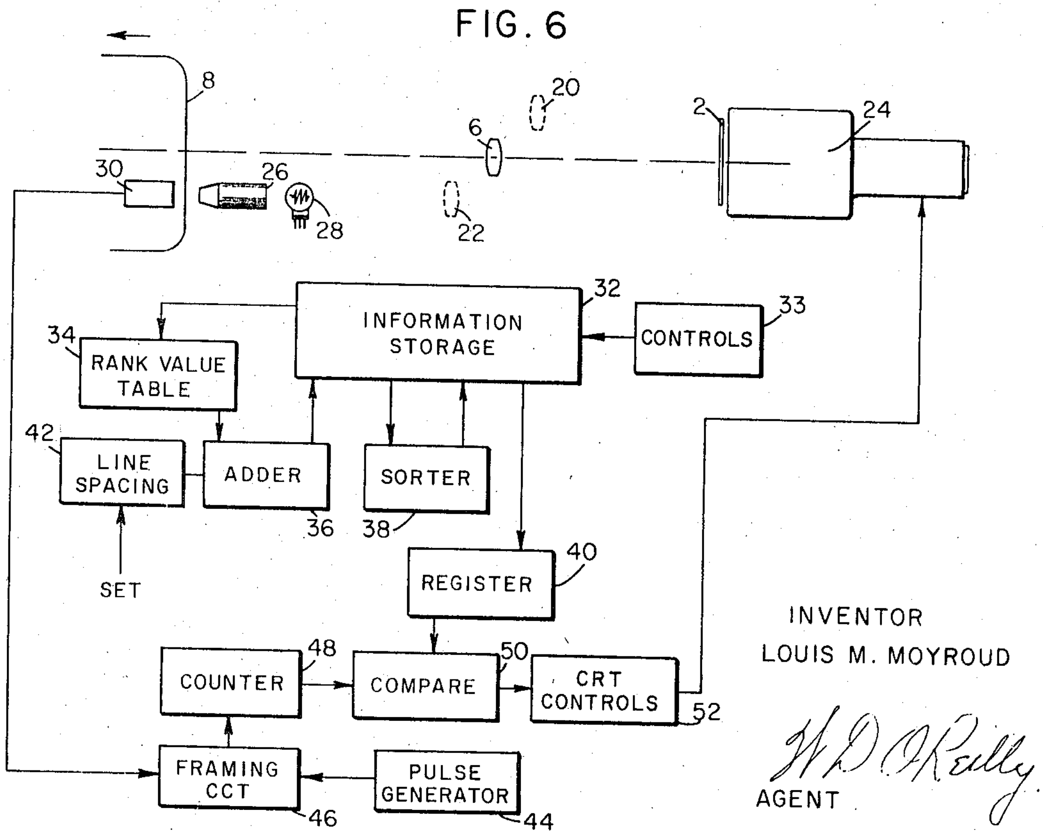
FIG. 6 is a diagram representing the major components and functions of the machine.

Referring now to FIG. 6 of the drawings, a conventional CRT 24 is shown as the source of illumination for matrix 2. As has been discussed previously, a CRT is not the only permissible light source in this invention. Furthermore, it has been mentioned before that conventional point-size changing means may be included, if desired. Numerals 20, 6, and 22 schematically designate some of the individual lenses of a conventional lens turret to accomplish this function. The character identity codes are stored in a conventional information storage 32 (FIG 6), which may be part of a computer. The storage is controlled by circuit 33 which, upon a "start" signal causes the characters of one or a group of lines to be taken out of storage to rank table 34 where they are assigned a "rank" value (if desired, the rank value could be part of the character codes, in which case no rank table is necessary) and then to an adder 36 where the "accumulated line spacing" value represented in box 42 is added to the rank value, and back to storage 32. When the characters are returned to the storage after this first cycle they will be represented by the "flash" values shown in FIG. 4. Each character is now represented in the storage by a number representing its flash value (rank value plus the accumulated line spacing value), by a letter (or number, if appropriate) representing the identity or row number of the character, and by a figure representative of the column number of the character. During its second cycle the machine sorts and classifies each character according to its flash value as explained in U.S. Pat. No 3,188,929. This operation can be performed by a sorting circuit 38 (FIG. 6). At the end of the second cycle the characters are returned, classified by flash value, to storage 32.

At this point, the characters of the four lines to be composed are classified as shown in FIG. 5. They will be projected in the order shown in the figure—"D" of the third line after the film has moved 52 points, followed by "C" of the fourth line, followed by "G" of the second line etc. As mentioned previously, synchronizing pulses (as shown in FIGS. 1 and 6 of the drawings) can be derived from the film-driving mechanism or by slits or marks located on the film itself. However, as these marks have to be spaced by several points or other fine machine units for mechanical reasons, these pulses can be utilized as framing pulses only (and not as timing pulses), as explained in U.S. Pat No. 3,291,015, which is hereby expressly incorporated by reference. Thus, the film can be driven by a synchronous motor (providing framing or "rough" timing pulses), and "fine" timing pulses can be generated by a clock or pulse generator 44. For example, the clock pulses can occur at such rate that the film moves one-sixteenth of a point between two consecutive pulses, and the ("rough") timing marks 11 can be spaced by 8 points—a framing pulse will thus occur after each generation of a group of 128 clock pulses. The framing circuit 46 of FIG. 6 also generates a pulse for each point of displacement of the film. These are transferred to a counter 48, connected to a comparison circuit 50. A gate, not shown, prevents the transfer of pulses to the counter until the "start" pulse occurring at the beginning of a new gage or record or group of lines etc., has occurred. This pulse, for example will occur a short time interval after the text to be composed has been sorted and restored in block 32. The character to be flashed first ("D" of the third line) is now transferred to register 40 and to comparison circuit 50 where its flash value is compared to the content of counter 48. As soon as the value of counter 48 reaches the value of register 40 a signal is sent to the CRT control circuit 52 for deflections and unblanking. Thus, in the example given, letter "D" of the second column will be flashed at pulse 52, occurring after the film has moved 52 points from a position which can be arbitrarily chosen; then "C" of the sixth column at pulse 54; then "G" of the third column at pulse 56 . . . . and finally "T" of the fourth column at pulse 190. The letters flashed to produce the four lines of the example are shown in shaded area in FIG. 2.

The embodiment which has just been described is an uninvolved—yet significant—innovation in phototypesetting. The matrix is fixed. The lens is stationary during composition—it does not reciprocate—thus it does not have to overcome the inertia inherent in a stop-start-reverse direction mechanism. Only the film moves during composition—and it moves rapidly and continuously in the same direction. Since the matrix has all of the characters necessary for the composition of a full page of text, and the film is continuously moving in the plane of a fixed lens, a full page of text (rather than a single line) is composed during a single "sweep." In other words, a full page of text is composed as the film moves through a distance equal to the height of the page undergoing composition, plus the height of the matrix image as projected by the lens (see FIG. 1). Since the film moves at a speed of about 3 feet per second, it is apparent that this is an extremely high-speed photocomposing machine.

Figure 8:
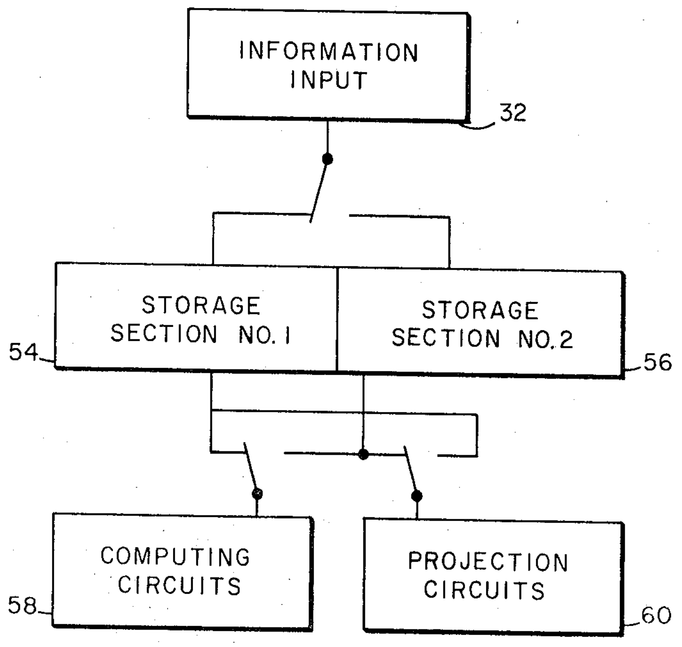
FIG. 8 is a simplified block diagram of a section of the circuit of one embodiment of the invention.

In another embodiment of the invention, groups of lines are alternatively stored in two sections of a memory as shown in FIG. 8. A number of lines at least equal to the number of different characters constitutes one "load." The computation of the flash value of the second load can proceed while the first load is being flashed. A load can consist, for example, of 90 lines. As shown in FIG. 8, the line information is transferred from storage (memory or tape) 32 alternatively to storage sections 54 and 56 via a conventional two-position switch. In FIG. 8, 90 lines transferred to storage section 54 have been "computed" for determination of flash value, and restored in the same storage section as has been previously described with respect to FIG. 6 of the drawings. Simultaneously, the 90 previous lines are being transferred from storage section 56 to projection circuits 60. As soon as all the characters of these 90 lines have been projected, the projection circuits will be associated with storage section 54 and the input information and computing circuit with storage section 56 to store a new group of 90 lines.

Counter 48 (FIG. 6) resets automatically to zero after a predetermined number of pulses, for example 1024. This figure can also be considered (in this particular example) as the upper limit of flash values. In other words, if the flash value of a character reaches 1028, it will be stored as a flash value of 4. In this way the composition of text can proceed in a continuous manner.

Figure 7:
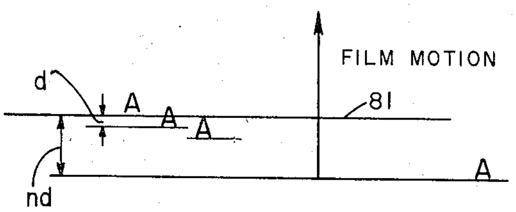
FIG. 7 represents one arrangement of matrix characters along a line.

In the case where the illumination of characters is obtained by a CRT it is necessary, in order to keep the composing speed at a maximum, to provide for special cases. It is conceivable, for example, that one line will consist of the same character repeated from beginning to end. In this case all the characters should be flashed simultaneously which, evidently, cannot be done if a CRT is used as the light source. In the arrangement shown in FIG. 7 therefore, the characters of each row are not located on a common base line. FIG. 7 represents the relative locations of the letter A on a given row of the matrix. Line 81 represents the base line of the first character of the projected row. This line is perpendicular to the direction of displacement of the film. The base line of the second "A" is distant from the first by an incremental distance *d*, etc., . . . the base line of the 100th A (for 100-character lines) being displaced from base line 81 by 100 increments. This increment can be equal, for example, to two "fine units" of the machine or two-sixteenths of a point. In this case, with a film speed of 1 millimeter per millisecond, the film will move one increment in approximately 40 microseconds. It has been found by experience that with the proper kind of CRT, characters projected with a 35-microsecond exposure produce images of good density on the film. Thus, if a full line of one hundred "A's" must be composed, it will take 4 milliseconds to produce the line (40 microseconds per character).

Figure 9:
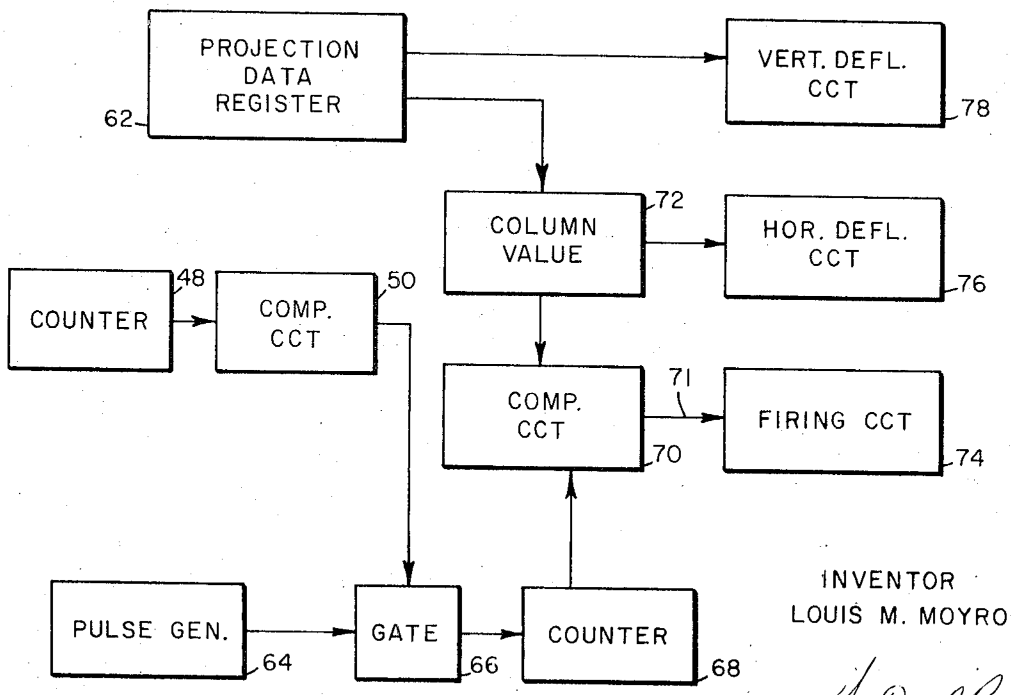
FIG. 9 is another block diagram representing the control of one variety of light source used in the invention.

The delay introduced in the flash circuit in order to successively project characters of the same row can be obtained as shown in FIG. 9. In this figure, projection data register 62 could, if desired, be identical to register 40 of FIG. 6. As explained earlier, all the necessary data for character projection timing and selection is stored in this register. The delay which is to be introduced into the flash circuit to compensate for the staggering of characters of each row can be obtained by sending "increment" pulses produced by generator 64 through a gate 66 controlled by the comparison circuit 50 (see FIG. 6) to a counter 68, and by using a comparison circuit 70 to compare the value of the counter to the "column value" 72. If consecutive characters of a row are vertically spaced by one "increment" as explained above, the numerical value of each column (see FIG. 2) represents also the number of "increments" by which the film must be allowed to move between successive flashes of characters on the same row. When counter 68 reaches the same value as the column number, the firing order is transferred by wire 71 to the unblanking or firing circuit 74 of the CRT. Prior to this time, the proper vertical deflection has been prepared by the row value of the character to be projected and the proper horizontal deflection by the column value of the same character. The CRT then produces a patch of light on the proper area of its face, as explained in U.S. Pat. Nos. 3,291,015 and 3,416,420, both of which are hereby incorporated by reference, as is U.S. Pat. No. 3,188,929.

In order to minimize the occurrence of "simultaneous flashes" in the vertical direction that is, (characters having the same flash and column values) the spacing of character rows of the matrix is chosen so that it cannot be a multiple of the accumulated line-spacing values of the group of lines representing one "load." It is also possible to use several guns in the CRT to take care of the vary rare occasions where several characters have to be flashed simultaneously. If two or three characters have the same row and flash value and only one gun is used, then characters can be flashed successively at intervals of 30 microseconds. The small vertical misplacement of character images introduced can be considered negligible.

Figure 10:
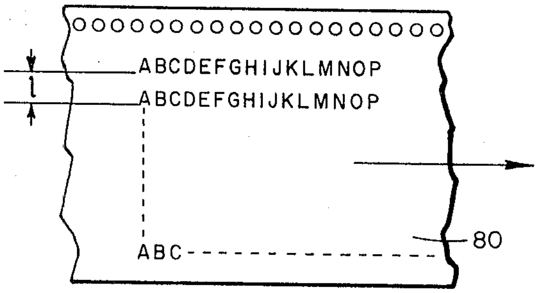
FIG. 10 is a partial view of a film with proportionally spaced characters.
Figure 12:
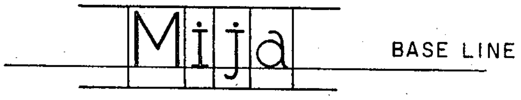
FIG. 12 depicts a group of proportionally spaced characters.

Referring now to FIGS. 10 and 12 of the drawings, it will be noted that the film has been turned 90° relative to its prior orientation so that the lines of text are now formed parallel to the edge of the film. In order to achieve the proportional character spacing depicted in FIG. 12 of the drawings, the "uniform character area" concept is replaced by a matrix having characters of varying width, based upon a known system such as 18 units of an "EM." Thus, a "W" may be 18 units wide, whereas an "A" may only be 9 units wide. In other words, the "W" will occupy a physical area on the matrix which is twice as great as that of the "A"—this arrangement is substantially identical to one which is fully set forth in U.S. Pat. No. 3,188,929 which has previously been incorporated by reference. In this manner, the character images are projected onto the film as shown in FIGS. 10 and 12.

The foregoing description is intended to be illustrative only. Various changes or modifications in the disclosed embodiments may occur to those skilled in the art. It is understood, therefore, that all such modifications which would be apparent to one skilled in the art are included within the scope of the present invention.

What is claimed is: .....

1. A high-speed photographic-type composing machine having:

a stationary character matrix, said matrix having all of the characters necessary for the composition of a full page of text instantaneously accessible, at least some of the characters of the matrix having variable widths relative to one another, a source of illumination associated with said character matrix, an image-receiving surface which is adapted to move continuously in a predetermined direction in the image plane of a fixed lens, said image-receiving surface being mounted for movement in a direction parallel to the base lines of the matrix characters, in order that the character images projected on said surface may be proportionally spaced from one another in accordance with their respective relative widths, and timing control means associated with said image-receiving surface, for selectively illuminating any of said characters, to be projected thereon.

* * * * *